United States Patent [19]

Kunert et al.

[11] Patent Number: 5,057,265

[45] Date of Patent: Oct. 15, 1991

[54] METHOD OF MAKING A SPACER FOR A WINDSHIELD BRACKET

[75] Inventors: Heinz Kunert, Cologne; Gerd Cornils, Merzenich-Girbelsrath; Heinrich Schnitter, Simmerath, all of Fed. Rep. of Germany

[73] Assignee: Saint Gobain Vitrage International, Courbevoie, France

[21] Appl. No.: 436,280

[22] Filed: Nov. 14, 1989

Related U.S. Application Data

[63] Continuation-in-part of Ser. No. 360,654, Jun. 2, 1989, Pat. No. 4,933,032.

[30] Foreign Application Priority Data

Sep. 12, 1989 [DE] Fed. Rep. of Germany ....... 3930414

[51] Int. Cl.⁵ ............................................. B29C 47/02
[52] U.S. Cl. ................................... 264/511; 264/161; 264/250; 264/259; 264/296
[58] Field of Search ............... 264/248, 250, 252, 259, 264/296, 161, 511

[56] References Cited

U.S. PATENT DOCUMENTS

| | | | |
|---|---|---|---|
| 3,416,833 | 12/1968 | Griffin | 52/208 |
| 3,478,475 | 11/1969 | Strack | 52/208 |
| 3,779,794 | 12/1973 | De Santos | 117/72 |
| 4,433,010 | 2/1984 | Pedain et al. | 427/160 |
| 4,551,372 | 11/1985 | Kunert | 428/38 |
| 4,561,625 | 12/1985 | Weaver | 264/252 |
| 4,571,278 | 2/1986 | Kunert | 264/259 |
| 4,581,276 | 4/1986 | Kunert et al. | 428/157 |
| 4,606,159 | 8/1986 | Kunert | 52/208 |
| 4,635,420 | 1/1987 | Batky | 156/108 |
| 4,648,222 | 3/1987 | Niyata et al. | 52/208 |
| 4,681,794 | 7/1987 | Kunert et al. | 428/18 |
| 4,704,175 | 11/1987 | Kunert et al. | 156/108 |
| 4,719,069 | 2/1988 | Reymann et al. | 264/296 |
| 4,775,570 | 10/1988 | Ohlenforst et al. | 428/83 |
| 4,839,122 | 6/1989 | Weaver | 264/129 |
| 4,933,032 | 6/1990 | Kunert | 156/108 |

FOREIGN PATENT DOCUMENTS

| | | | |
|---|---|---|---|
| 069021 | 1/1983 | European Pat. Off. | 264/252 |
| 0121480 | 10/1984 | European Pat. Off. | |
| 121481 | 10/1984 | European Pat. Off. | |
| 148797 | 7/1985 | European Pat. Off. | 296/96.21 |
| 298788 | 1/1989 | European Pat. Off. | 296/93 |
| 307317 | 3/1989 | European Pat. Off. | |
| 0024501 | 3/1981 | Fed. Rep. of Germany | |
| 3323006 | 1/1985 | Fed. Rep. of Germany | 296/201 |
| 3447271 | 6/1986 | Fed. Rep. of Germany | |
| 3536806 | 4/1987 | Fed. Rep. of Germany | |
| 3627536 | 2/1988 | Fed. Rep. of Germany | 296/201 |
| 3741899 | 6/1989 | Fed. Rep. of Germany | 264/250 |
| 3730345.7 | 9/1987 | France | |
| 57-58509 | 4/1982 | Japan | |
| 62-163818 | 7/1987 | Japan | |
| 2143569 | 2/1985 | United Kingdom | 296/96.21 |

*Primary Examiner*—Jan H. Silbaugh
*Assistant Examiner*—Brian J. Eastley
*Attorney, Agent, or Firm*—Pennie & Edmonds

[57] ABSTRACT

A method for producing a spacer for a windshield bracket including laying a window glazing (1) on a support frame (15), and guiding an extrusion head along the glazing edge. The extrusion head has an extrusion die (16) with a calibrated opening (18) corresponding to the desired cross-section of the spacer. The extrudable polymer compound for the spacer is fed to the extrusion die (16) by a pipe (19) connected to a feeding and pumping mechanism. The extrusion die (16) is then removed from the glazing (1). The transition zone of the profiled spacer 8 is then subjected to additional compression by operation of upper and lower rams (23, 25), the rams exhibiting forming areas corresponding to the lower and upper forms of the spacer, respectively. Release films 33 and 34 are laid on forming areas of the lower ram (23) and the upper ram (25) prior to the compression molding process. After the compression molding, film pieces 33 and 34 adhere to the polymer material, but do not bond thereto. Any additional flash or tab (41) is cut off along the edge (40) of the lip portion (10) of the spacer.

26 Claims, 6 Drawing Sheets

METHOD OF MAKING A SPACER FOR A WINDSHIELD BRACKET

CROSS-REFERENCE TO RELATED APPLICATIONS

This application is a continuation-in-part of application Ser. No. 07/360,654 filed June 2, 1989 which issued as U.S. Pat. No. 4,933,032 on June 12, 1990.

FIELD OF THE INVENTION

The invention relates to a glazing provided for bonding to the attachment flange of a window frame, in particular a motor vehicle glazing, with a profiled spacer produced by extrusion of a polymer on the side of the glazing opposite the attachment flange. The profiled spacer acts as a support and centering element upon insertion of the glazing, as well as during the setting of the assembly adhesive. The invention describes the process for the production of such a glazing as well as a process and apparatus for performing the process.

BACKGROUND OF THE INVENTION

Motor vehicle glazings are often attached today by direct bonding to the attachment flange of the window frame in the motor vehicle body. It has proven useful to prepare the glazing prior to the assembly process, by providing the glazing with an adhesive material that is produced by extrusion on the glazing, which after setting, acts as an intermediate body between the glazing and the assembly adhesive. This eliminates the requirement of cleaning and priming the glazing on the assembly line of the motor vehicle plant, necessary for the bonding of the glazing, which results in the insertion of the glazing into the body being performed more economically. This process is known, for example, from EP-0 121 481-A1.

When inserting the glazing into the window frame of the body, the glazing must be correctly positioned and then held stationary during the setting phase of the assembly adhesive. As a rule, additional assembly aids and/or support elements are required for this purpose. EP 307 317-A1 describes a motor vehicle glazing comprised of a spacer oriented perpendicular to the glazing surface and having a support surface that bears the weight component of the glazing running in the direction of the glazing plane in the installation position, and a bracket having a support element that interacts with the support surface of the spacer. The support surface and support element cooperate to properly position and set the glazing. This known solution, however, requires additional support elements in the window frame. Further, it is required that the support elements in the window frame lie at a constant distance from the outwardly visible periphery of the window frame. Otherwise, the junction between the peripheral area of the glazing and the flange of the window frame opposite the peripheral area will exhibit a varying width, which results in the requirement to cover this juncture with an additional covering profile.

The object of the invention is to configure a motor vehicle glazing comprised of an extruded profiled spacer so that the proper centering and bracing of the glazing, during the setting phase of the assembly adhesive, is guaranteed without additional support elements being required in the window frame.

SUMMARY OF THE INVENTION

The invention proposes providing a profiled spacer which acts as a support and centering element for the glazing. The profiled spacer includes a lip portion which is oriented approximately parallel to the glazing surface and which projects beyond the peripheral or edge of the glazing. The lip portion, in the installation position of the glazing, rests against the flange of the window frame running parallel to the peripheral area of the glazing.

The profiled spacer described in the invention is dimensioned in thickness and length so that the lip portion may deform during insertion of the glazing into the window frame. The lip portion is bent from about 45 to 90 degrees relative to the original orientation of the lip portion. While the lip portion of the spacer carries the dead weight of the glazing on the one side, it simultaneously assumes the centering and sealing function for the surrounding gap between the peripheral area of the glazing and the flange of the window frame opposite the peripheral area. This results in said gap having a constant width. The covering of said gap by an additional sealing or decorative profile is therefore, no longer necessary. Hence, an extraordinarily economical solution is provided by the invention.

If the said gap remaining between the peripheral area of the glazing and the opposite flange of the window opening of the body is not covered by an additional sealing or decorative profile, the lip portion projecting beyond the peripheral area of the glazing is outwardly visible. In this case, special measures must be taken to configure the transition zone between the beginning and the end of the extruded profile spacer to obtain a continuous spacer.

The object of the invention also includes a process for the production of a glazing with a continuous profile spacer that exhibits evenness and shape retention. The glazing produced this way will not require additional covering on the edge in the installed state.

The process described according to the invention is characterized as such that a polymer with a viscosity and shape retention is used during extrusion, so that the lip portion projecting beyond the peripheral area of the glazing retains its form without support. In addition, the transition zone of the beginning and end of the profile spacer is compression molded by calibrated compression molds. Here it has proven especially suitable in a further development of the invention, to place a thin plastic film between the compression molds and the profile spacer for each case. The plastic film that adheres to the profile spacer after the additional compression molding process, can be easily removed after the setting of the polymer.

Suitable compression molds for the additional compression molding of the critical transition zones are also the object of the invention. A feature of the compression molds according to the invention is that the compression molds are provided with boreholes or openings that empty into the forming areas, boreholes or openings that may be connected to a vacuum pipe. This allows for the compression molds to hold thin plastic films, by suction, on their forming areas and release them immediately after the mold process by removal of the vacuum.

BRIEF DESCRIPTION OF THE DRAWINGS

Further details and advantages of the invention are described in detail below based on the drawings, wherein.

DETAILED DESCRIPTION OF THE PREFERRED EMBODIMENTS

Figure 1:
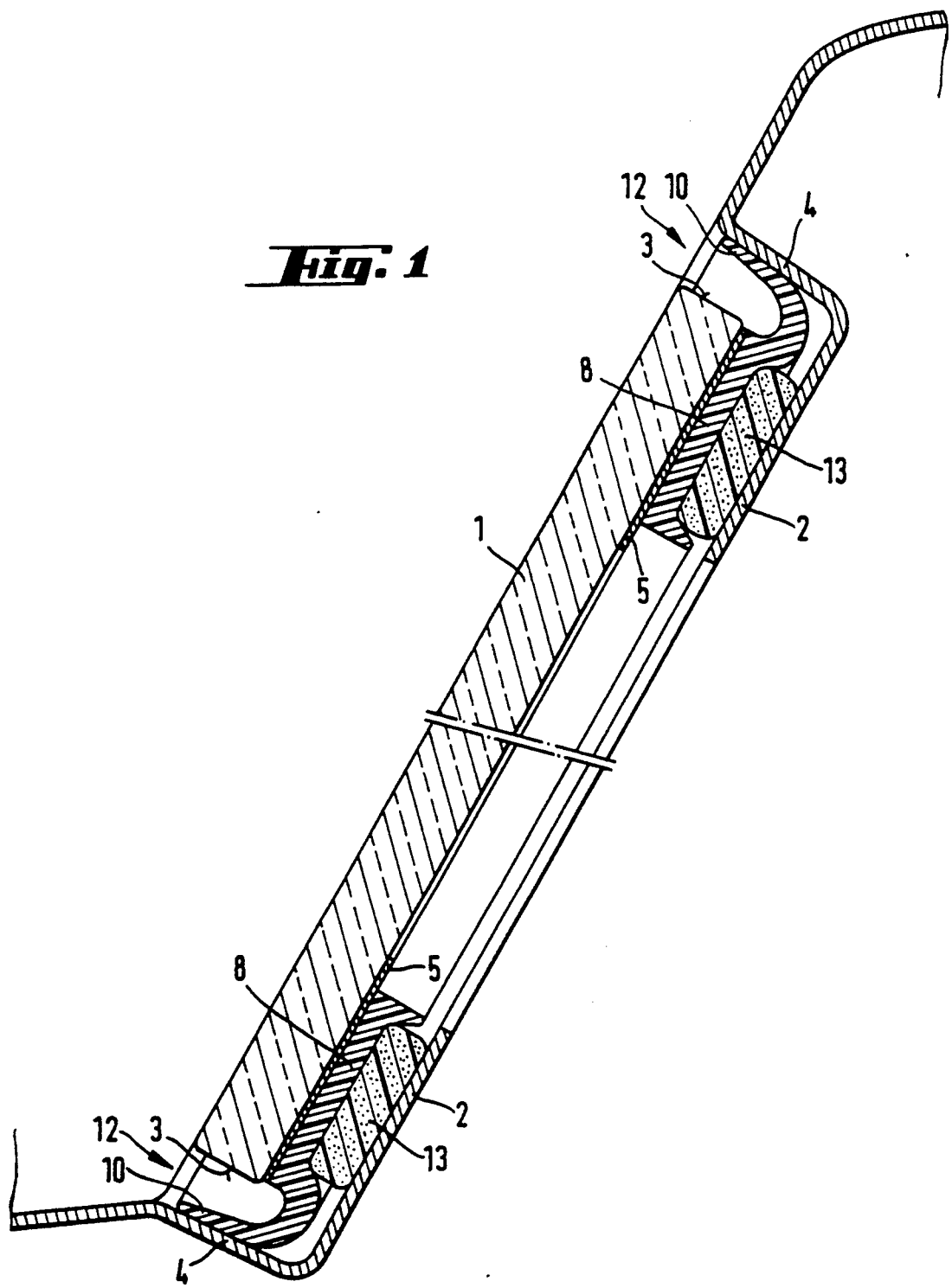
FIG. 1 discloses a motor vehicle glazing made according to the invention in the installed state, in the form of a sectional drawing.

In the case represented in FIG. 1, glazing 1 is a windshield that is inserted in the corresponding window opening of a motor vehicle body. The window opening is delineated by attachment flange 2, which runs parallel to the glazing surface, and by frame section 4 that runs parallel to peripheral area 3 of glazing 1. Glazing 1 is represented as a monolithic glazing, but said glazing may also be comprised of a multilayer laminated glazing. Along the periphery of glazing 1 there is provided, on the side facing attachment flange 2, an opaque layer 5 that consists, for example, of a baked enamel. The object of layer 5 is to prevent the adhesive compound lying behind layer 5 from being outwardly visible and simultaneously to protect the adhesive compound from UV rays.

Glazing 1 is provided on the side facing the attachment flange 2 with a profiled spacer 8, made of a polymer that is elastomeric in the set state. Profiled spacer 8 adheres to opaque layer 5. In the further description, this opaque, layer 5 is not represented for the sake of greater clarity.

Profiled spacer 8 exhibits a continuous lip portion 10. Before installation of glazing 1 in the window frame, lip portion 10 has a straight form. Lip portion 10 is oriented approximately parallel to the glazing surface and projects beyond peripheral area 3 of glazing 1 by about 5 to 10 mm. During insertion of the glazing into the window frame, lip portion 10 is bent back as shown and rests over its entire periphery against the window frame section 4 which runs parallel to peripheral area 3 of the glazing. During insertion of the glazing into the window frame, glazing 1 is automatically centered, so that a gap 12 of even width remains all around glazing 1. At the same time, lip portion 10 acts in the lower area of glazing 1 to support the glazing weight, so that no additional support measures are required during the setting process of the assembly adhesive. Finally, lip portion 10 achieves the further object of closing and sealing the gap 12.

The dimensioning of lip portion 10, i.e., in length and thickness, shall be selected so the stated objects of lip portion 10 are fulfilled in an optimal way.

The connection of glazing 1 equipped in advance with the profiled spacer 8, to the attachment flange 2 is performed with the aid of an assembly adhesive bead 13.

The assembly adhesive bead 13 consists of a polymer that adheres solidly and permanently to the profiled spacer 8; for example, a moisture setting one-component polyurethane. The pressing of the glazing 1 against the attachment flange 2 required during the setting time of adhesive bead 13, is also guaranteed by the lip portion 10 of the profiled spacer 8 which, because of its high coefficient of friction and its relative stiffness, absorbs restoring forces possibly exerted by the adhesive bead 13.

The production of profiled spacer 8 is performed, with the aid of the extrusion technique known in the art, by extruding a suitable polymer that adheres to the glazing by bonding. As for polymers used in the production of the profiled spacer 8, one-component polyurethane prepolymers in paste form that set after extrusion, under the influence of atmospheric moisture, into high modulus elastomers are acceptable. Such polyurethane systems are described in U.S. Pat. No. 3,7 79 794. Polyurethane systems on a two-component basis may also be used. For example, adhesive systems as described in European patents 0 083 797 and 0 024 501. Depending on the adhesive compound used, the surface on which the admissive material is applied is to be pretreated in the required manner and as an option, provided with one or more suitable priming layers.

Figure 2:
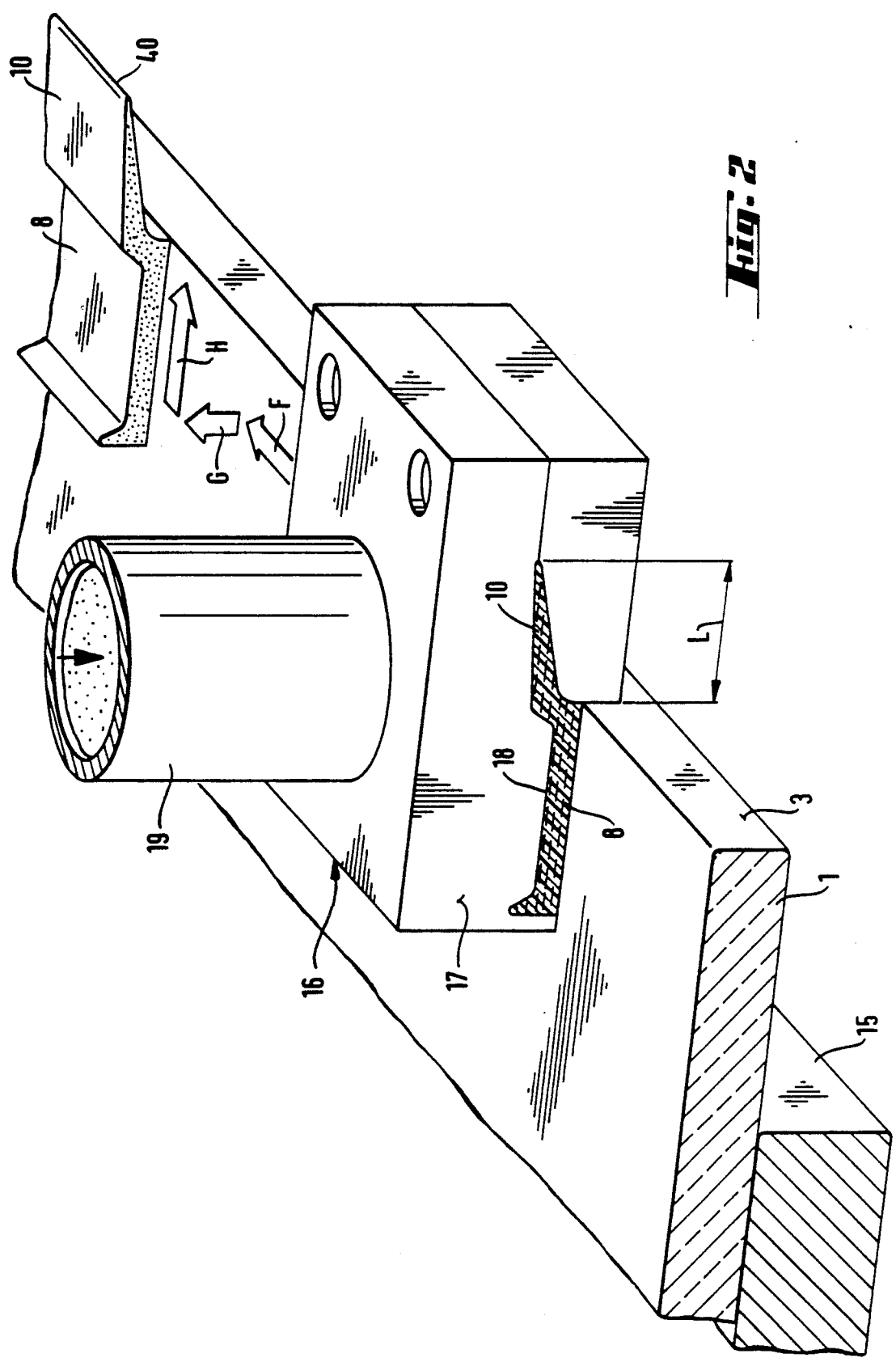
FIG. 2 discloses the production of the profile spacer with the aid of an extrusion die.

To produce the profiled spacer 8 on the glazing 1, the latter is laid in horizontal position on a support frame 15, as can be seen in FIG. 2, and is kept in this position by means such as suction devices. Then an extrusion head is guided along the glazing edge with the aid of a suitably programmed robot. The extrusion head exhibits an extrusion die 16 that is placed on the glazing edge and moves in the direction of arrow F. On the rear side 17, extrusion die 16 has a calibrated opening 18, which corresponds to the desired cross section of profile spacer 8. Lip portion 10, of Length L, formed by the extrusion die 16, has a shape retention so that said lip portion 10 retains proper form and is essentially horizontally orientated, without having to be supported. The extrudable polymer compound is fed to extrusion die 16 by pipe 19. Pipe 19 connects extrusion die 16 with a feeding and pumping mechanism. The polymer compound is fed by the pumping mechanism to extrusion die 16 at the required pressure and with precise feeding. The extrusion head is guided along entire peripheral area 3 around glazing 1, so that a closed continuous profiled spacer 8 is formed. As soon as extrusion die 16 reaches the point at which the extrusion process began, the feed of the polymer compound, and the movement of the extrusion head is interrupted. Extrusion die 16 is then raised approximately in the direction of arrow G and is removed from glazing 1 in the raised position in the direction of arrow H.

Figure 3:
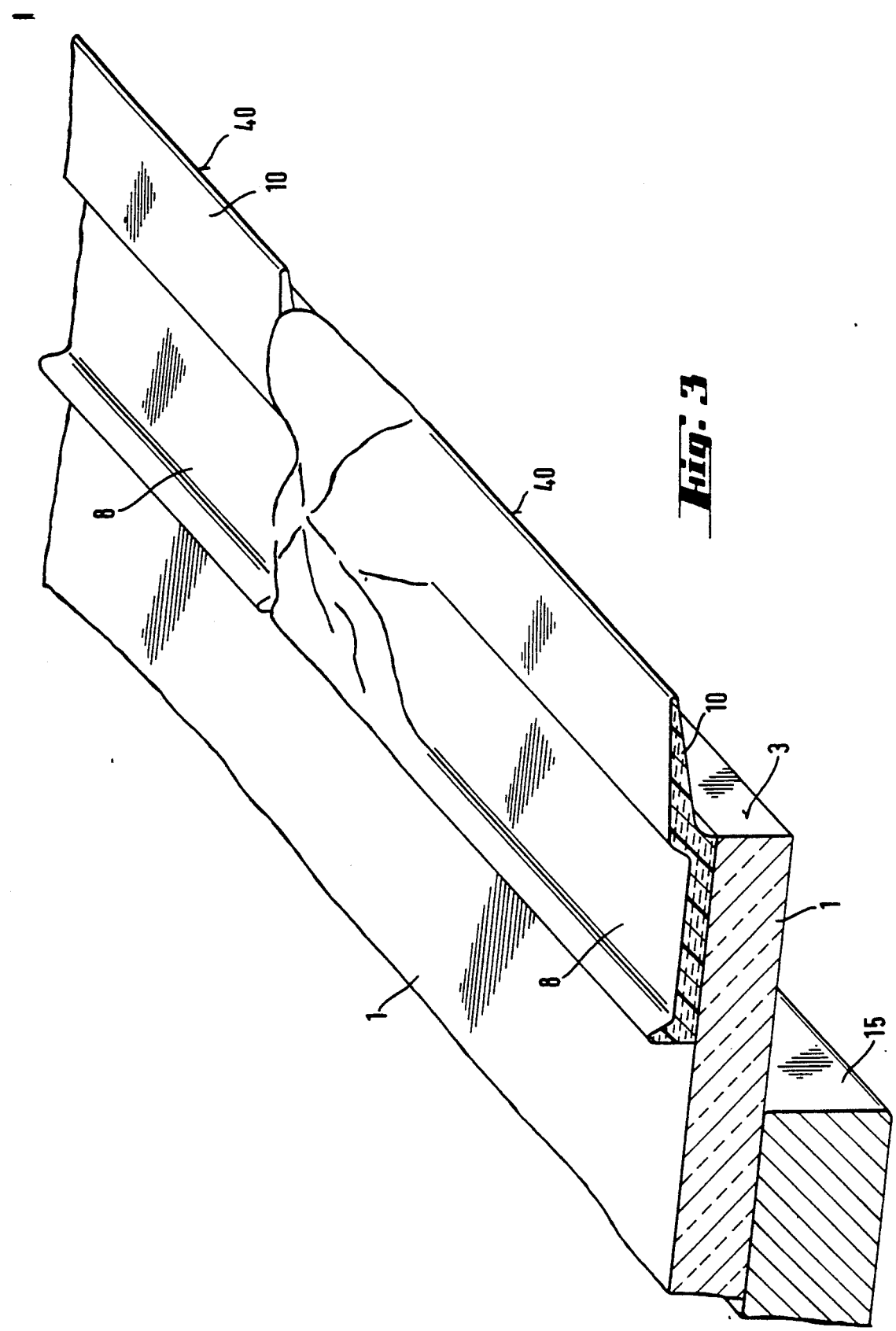
FIG. 3 discloses the transition zone of the profile spacer after removal of the extrusion die, FIG. 4 discloses the additional compression molding process of the transition zone with the aid of compression molds according to he invention.
Figure 4:
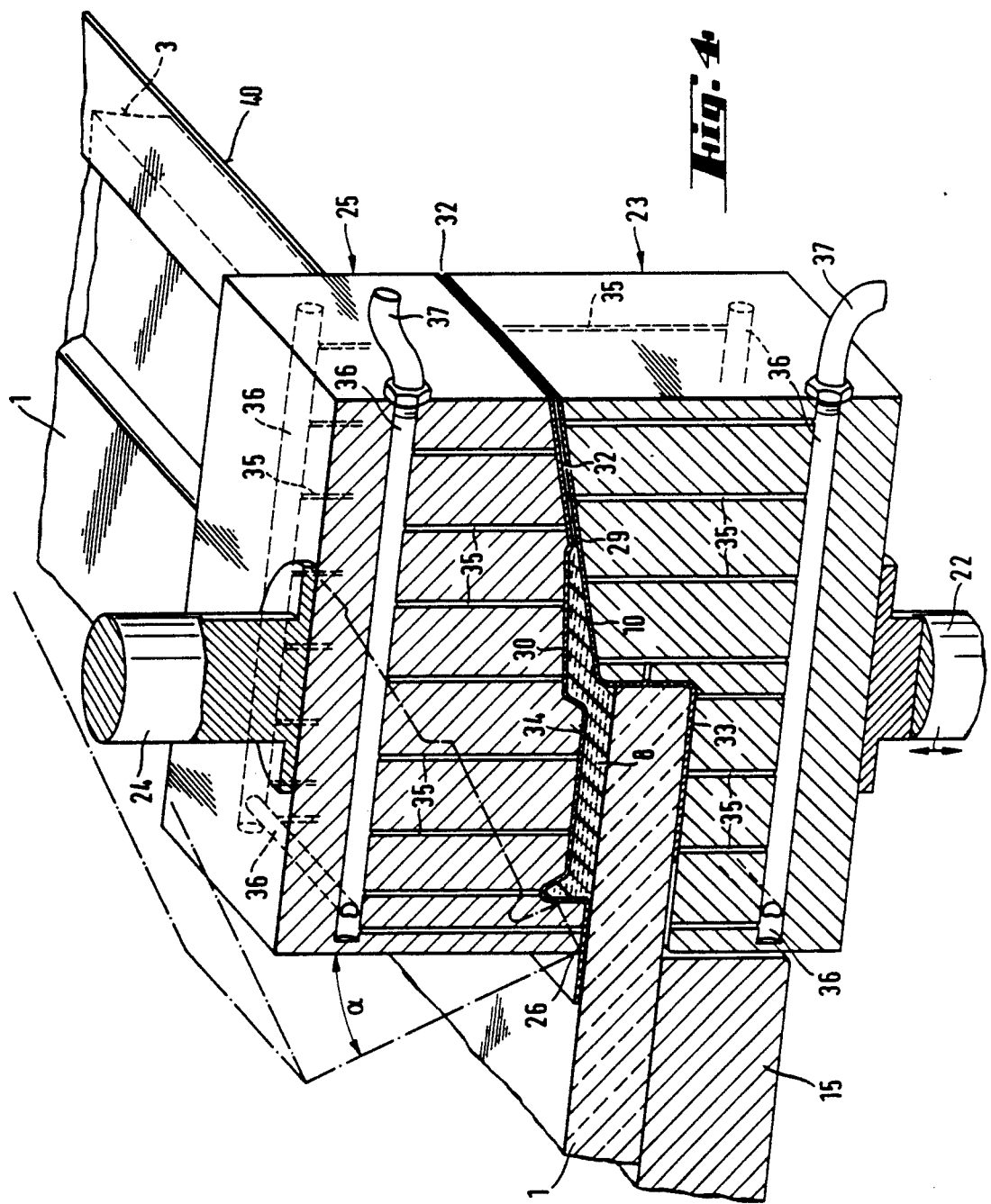
Figure 5:
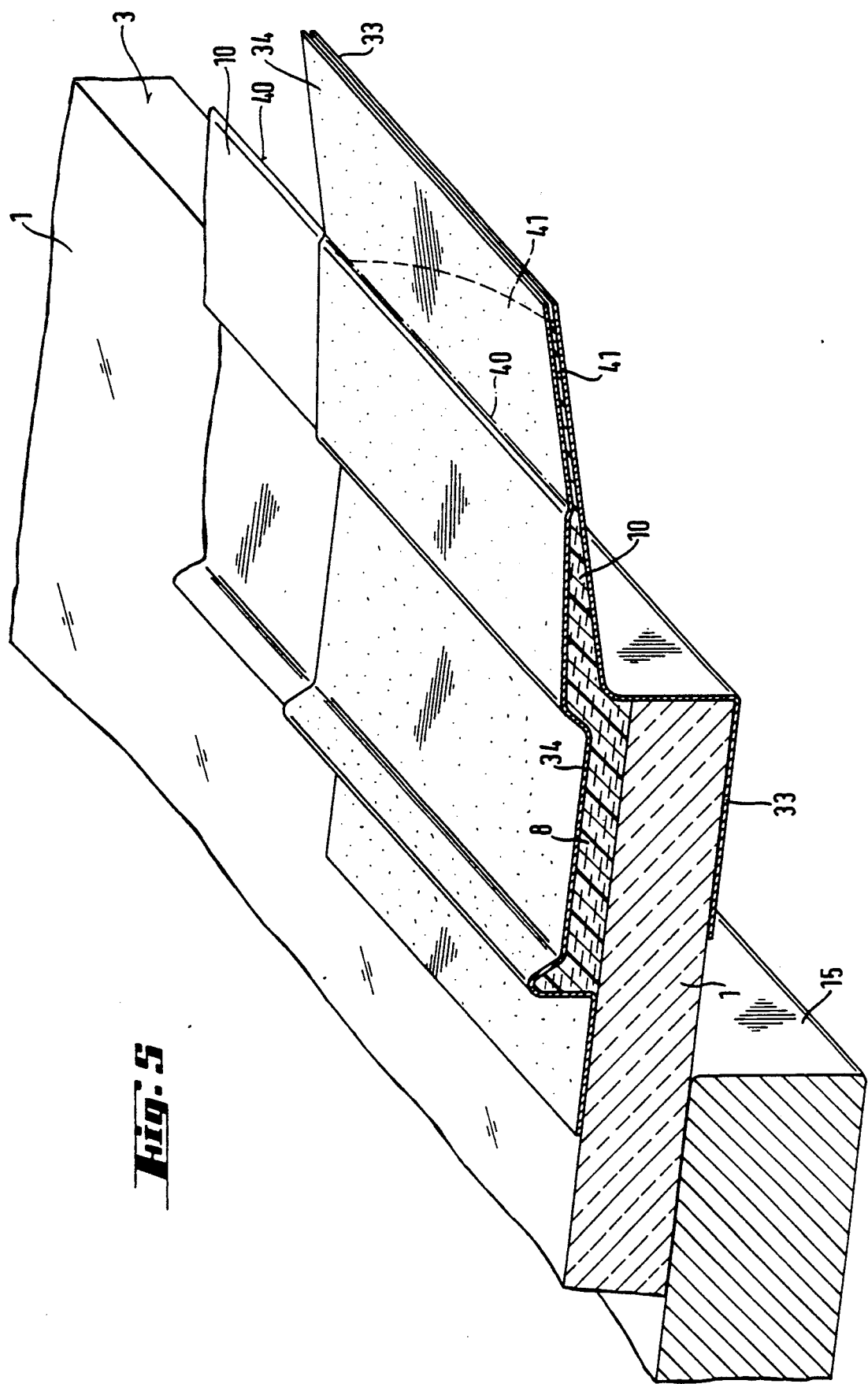
FIG. 5 discloses the transition zone of the profile spacer after the additional compression molding process.

As represented in FIG. 3, at the point at which the extrusion die 16 is removed from the glazing 1 and at which the beginning and end of the profile spacer 8 meet, a seam is produced in the profile spacer 8 which results in the profiled spacer 8 exhibiting a pronounced discontinuity. This seam or transition zone between the perfect cross section at the beginning of the frame and the perfect cross section at the end of the frame, is further molded by an additional compression molding process, as now described based on FIGS. 4 to 6.

During the additional compression molding of the transition zone of profile spacer 8, glazing 1 remains lying on support frame 15. As soon as the extrusion head has been removed from the glazing, a moldholder not represented in the drawings is swung in from the side, over the edge area of the glazing. A lower ram 23 is placed on the moldholder by a suitable mounting 22, as is an upper ram 25 by a suitable mounting 24. As soon as it has reached its position underneath the glazing, lower ram 23 makes a lifting movement until it lies against the under side of glazing 1. Upper ram 25, in its upper position, assumes a position slanted at angle alpha and is lowered in this slanted position, until edge 26 touches the glass surface. Ram 25 is then swung around edge 26 and is pressed against the glazing and lower ram 23, giving the profiled spacer 8, including lip portion 10 in the transition zone, the desired cross section form. Thus, the irregularities in the transition zone caused by the process, are eliminated.

Lower ram 23 exhibits an upper, calibrated forming area 29 that is formed according to the thickness of glazing 1 and the shape of the lower area of contact of lip portion 10. Correspondingly, upper ram 25 exhibits a calibrated forming area 30, which corresponds to the upper periphery of profiled spacer 8, including lip portion 10. The described lowering and swinging movement of upper ram 25 fills any present hollow spaces in the profile spacer 8. Any excess polymer compound is pressed into the extension of lip portion 10 in gap 32 and may be cut off lip portion 10 as a flash after setting.

Before the compression molding process, i.e., with the compression molds in an uncompressed state, release films 33 and 34 are laid on forming area 29 of lower ram 23 and on forming area 30 of upper ram 25, the release films being approximately 4 to 10 micrometers thick. The film size corresponds in each case, to the size of the forming area. Films 33 and 34 are to rest in each case tightly on the associated forming area. For this purpose, lower ram 23 and upper ram 25 are each provided with a series of thin boreholes 35 that empty into forming areas 29 or 30 and that originate at distribution boreholes 36. One of distribution boreholes 36 is connected by a hose line 37 to a vacuum pump. Whereby film pieces 33 and 34 are held against the respective forming area by the force of suction. After the additional compression molding process has ended, hose pipes 37 are ventilated, so that film pieces 33 and 34 detach from the forming area of the compression molds. Film pieces 33 and 34 adhere to the polymer material, but do not bond thereto. For this reason, after the setting of the polymer material, films 33 and 34 can easily be removed from profiled spacer 8 by simple pulling.

Films 33 and 34 consist of a material whose surface has anti-adhesive properties relative to the polymer material of the profile spacer 8. Thin films of polyester or polyethylene have proven themselves useful for this purpose. If a moisture setting system is used as polymer material for profiled spacer 8, films 33, 34 must exhibit a sufficient water vapor permeability, so the moisture necessary for the setting process can diffuse through the films. Optionally, films 33, 34 may exhibit a specific porosity or a microperforation.

Films 33, 34 confer on lip portion 10 an additional rigidity during the setting process. As mentioned above, the excess polymer compound is pressed, during the additional compression molding process, in the direction of the extension of lip portion 10 as a thin layer between two films 33, 34 and sets into a flash or tab 41 projecting beyond edge 40 of lip portion 10, FIG. 5. After the setting of the polymer is finished, this flash or tab 41 is cut along edge 40 of the lip portion 10 together with films 33 and 34 and is removed. This results in a clean final edge of lip portion 10 being achieved, even in the transition zone of profile spacer 8. Remaining film pieces 33, 34 are then removed from profile spacer 8 and lip portion 10.

Figure 6:
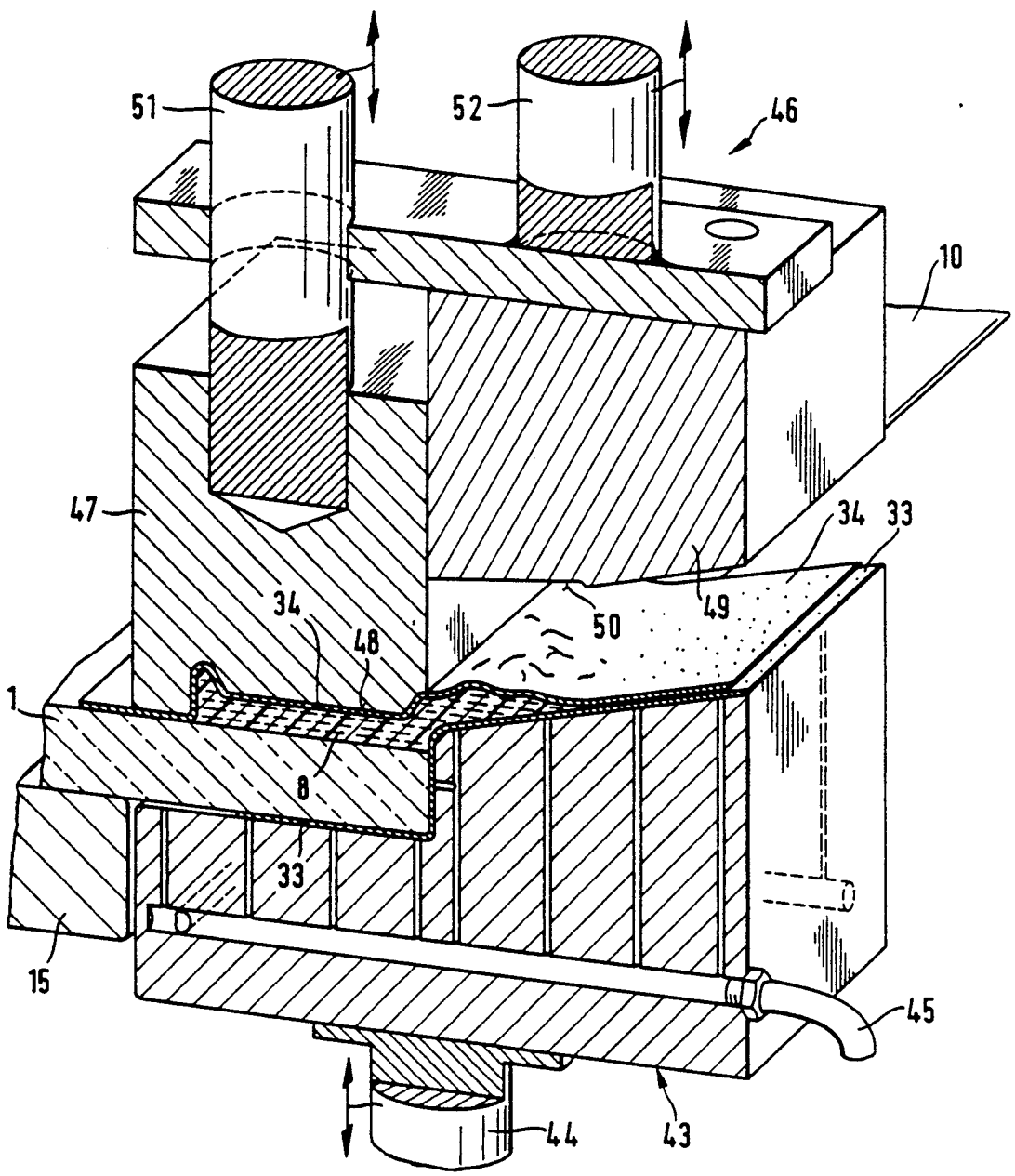
FIG. 6 discloses another embodiment of the compression molds according to the invention.

FIG. 6 shows another embodiment of the compression molds. Lower ram 43 corresponds in its design to lower ram 23 of FIG. 4. Together with upper compression mold 46, lower ram 43 is attached by guide rod 44 to a common mold mount not represented. Lower ram 43 is also provided on its upper forming area with boreholes that are connected to distribution boreholes in the ram and that may be connected, by these distribution boreholes and connection pipes 45, to a vacuum pump.

Upper ram 46 is made in two parts and incorporates part 47 with a calibrated forming area 48 for the section of the profiled frame above the glazing, as well as a part 49 with a calibrated forming area 50 for lip portion 10. Part 47 of the upper ram is actuated by guide bar 51 independently of part 49 which, for its part, is actuated by guide bar 52. The plastic film between the profiled spacer 8 and the upper ram is placed, after the positioning of lower ram 43 and before actuation of the upper ram, on the profiled spacer 8 and the adjacent areas of the glazing and the lower ram. Part 47 is then lowered to compression mold the U-shaped portion of spacer 8. After the lowering of part 47, part 49 is lowered and performs the additional compression molding of lip portion 10.

The embodiments of the invention described relate to the windshield of a motor vehicle. But the invention can also be applied in the same manner to glazings intended for doors, side windows, end gates, sun roofs, sliding roofs, rear flaps, and headlight flaps of motor vehicles. Further, the invention can be applied in other areas wherever glazings are attached in a frame by the adhesive method. In the vehicle field, for example, it may be used successfully also for the windows of trailers and railroad cars. It can also be used equally successfully for the windows of window openings in the construction sectors as well as for the installation of glazings in appliances and furniture, for example, household refrigerators.

What is claimed is:

1. A process for providing a spacer upon a glazing which comprises:
   guiding extrusion die means along and against an edge of said glazing while feeding a settable polymer to said die means and thereby forming a profiled extrudate of said polymer as a spacer upon a surface of said glazing adjacent said glazing edge, said polymer having viscosity and shape retention characteristics sufficient to said forming including forming said spacer so as to have a lip portion which is oriented essentially parallel to the glazing surface and which extends beyond the edge of said glazing without support.

2. The process of claim 1 wherein the guiding step is continued until a spacer is provided along all edges of the glazing, the beginning and end points of said spacer forming a transition zone.

3. The process of claim 1 which further comprises forming said spacer with first and second leg portions which define a recess for receiving an adhesive bead, said second leg portion being contiguous with said lip portion.

4. A process for providing a spacer upon a glazing which comprises:

placing extrusion die means against an edge of the glazing;

guiding said die means along and against said glazing edge while feeding a settable polymer to said die means and thereby forming a profiled extrudate of said polymer as a spacer upon a surface of said glazing, said polymer having viscosity and shape retention characteristic sufficient to and adjacent said edge, said forming including forming said spacer so as to have a lip portion which is oriented essentially parallel to the glazing surface and which extends beyond the edge of said glazing without support.

5. The process of claim 4 wherein the guiding step is continued until a spacer is provided along all edges of the glazing, the beginning and end points of said spacer forming a transition zone.

6. A process for providing a spacer upon a glazing which comprises:

placing extrusion die means adjacent an edge of a glazing;

guiding said die means along said glazing edge while feeding a settable polymer thereto so as to form a profiled extrudate of said polymer as a spacer upon said glazing, said polymer having a viscosity and shape retention characteristics sufficient to form a spacer having a lip portion which is oriented essentially parallel to the glazing surface and which extends beyond the edge of said glazing without support therefor wherein the guiding of said die means is continued until a spacer is provided along all edges of the glazing, the beginning and end points of said spacer forming a transition zone;

compression molding said transition zone so as to form a flash of excess polymer; and eliminating said flash.

7. The process of claim 6 wherein said flash eliminating step comprises cutting off said flash after setting of said polymer.

8. A process for providing a spacer upon a glazing, which comprises:

guiding extrusion die means along a glazing edge while feeding a settable polymer thereto so as to form a profiled extrudate of said polymer as a spacer upon said glazing adjacent said glazing edge, said polymer having viscosity and shape retention characteristics sufficient to form a spacer having a lip portion which is oriented essentially parallel to the glazing surface and which extends beyond the edge of said glazing with support therefor wherein the guiding is continued until a spacer is provided along all edges of the glazing, the beginning and end points of said spacer forming a transition zone;

compressing said transition zone so as to form a flash of excess polymer; and eliminating said flash.

9. The process of claim 8 wherein said flash eliminating step comprises cutting off said flash after setting of said polymer.

10. A process for providing a spacer upon a glazing, which comprises;

guiding extrusion die means along a glazing edge while feeding a settable polymer thereto so as to form a profiled extrudate of said polymer as a spacer upon said glazing adjacent said glazing edge, said polymer having viscosity and shape retention characteristics sufficient to form a spacer having a lip portion which is oriented essentially parallel to the glazing surface and which extends beyond the edge of said glazing with support therefor wherein the guiding is continued until a spacer is provided along all edges of the glazing, the beginning and end points of said spacer forming a transition zone;

compressing said transition zone so as to form a flash of excess polymer, said compressing step utilizing compression molds to eliminate said transition zone wherein a release film is placed between said compression molds and spacer prior to the compressing step, which film adheres to the spacer after said compressing step and;

eliminating said flash by cutting off said flash after setting of said polymer.

11. The process of claim 10 which further comprises holding the release film onto the compression mold surface by suction.

12. The process of claim 11 wherein the compression mold includes upper and lower forming areas and which further comprises placing said upper forming area at an angle with respect to the spacer, and tipping said upper forming area for contact with said lower forming area to complete the compressing step.

13. A process for providing a spacer upon a glazing, which comprises;

placing extrusion die means adjacent an edge of a glazing;

guiding said die means along said glazing edge while feeding a settable polymer thereto so as to form a profiled extrudate of said polymer as a spacer upon said glazing, said polymer having viscosity and shape retention characteristics sufficient to form a spacer having a lip portion which is oriented essentially parallel to the glazing surface and which extends beyond the edge of said glazing without support therefor wherein said guiding step is continued until a spacer is provided along all edges of the glazing with the end point of said spacer overlapping the beginning point so as to form a transition zone thereof;

compression molding said transition zone so as to form a flash of excess polymer wherein said compression molding step comprises utilizing compression molds to eliminate said transition zone and wherein a release film is placed between said compression molds and spacer prior to the compression molding step, which film adheres to the spacer after said molding step; and eliminating said flash by cutting off said flash after setting of said polymer.

14. The process of claim 13 wherein the release film is selected from one of a polyethylene or polyester film having a thickness of about 3 to 20 micrometers.

15. The process of claim 13 wherein the release film is water vapor-permeable for use with a moisture setting polymer.

16. The process of claim 13 wherein the release film is selected from one of a porous or microperforated film material.

17. The process of claim 13 wherein the release film is held onto the compression mold surface by suction.

18. The process of claim 13 wherein the compression mold includes upper and lower forming areas and which further comprises placing said upper forming area at an angle with respect to the spacer, and tipping said upper forming area for contact with said lower forming area to complete the compression molding step.

19. A process for providing a spacer upon a glazing, which comprises:
   placing an extrusion die means adjacent an edge of a glazing;
   guiding said die means along said glazing edge while feeding a settable polymer thereto so as form a profiled extrudate of said polymer upon said glazing with the beginning and end points of said spacer forming a transition zone, said polymer having viscosity and shape retention characteristics sufficient to form a spacer having a lip portion which is oriented essentially parallel to the glazing surface and which extends beyond the edge of said glazing without support therefore;
   compression molding said transition zone so as to form a flash of excess polymer; and
   eliminating said flash.

20. The process of claim 19 wherein said flash eliminating step comprises cutting said flash after setting of said polymer.

21. The process of claim 19 which further comprises placing a release film between said compression molds and said spacer prior to the compression molding step, said release film adhering to said spacer after said molding step.

22. The process of claim 21 wherein said release film is selected from one of polyethylene or polyester film having a thickness of about 3 to 20 micrometers.

23. The process of claim 22 wherein said release film is water vapor permeable for use with a moisture setting polymer.

24. The process of claim 21 wherein said release film is selected from one of a porous or microperforated film material.

25. The process of claim 21 wherein said release film is held onto the compression mold surface by suction.

26. The process of claim 21 wherein said compression mold includes upper and lower forming areas and which further comprises placing said upper forming area at an angle with respect to said spacer, and tipping said upper forming area for contact with said lower forming area to complete the compression molding step.

* * * * *